(12) United States Patent
Van Delden et al.

(10) Patent No.: US 12,313,166 B2
(45) Date of Patent: May 27, 2025

(54) VALVE BODY FOR AN EXPANSION VALVE

(71) Applicant: Mahle International GmbH, Stuttgart (DE)

(72) Inventors: Jeffrey Van Delden, Stuttgart (DE); Matthias Lindenberg, Stuttgart (DE); Florian Wetzel, Baltmannsweiler (DE)

(73) Assignee: Mahle International GmbH (DE)

( * ) Notice: Subject to any disclaimer, the term of this patent is extended or adjusted under 35 U.S.C. 154(b) by 479 days.

(21) Appl. No.: 17/540,215

(22) Filed: Dec. 1, 2021

(65) Prior Publication Data

US 2022/0235866 A1    Jul. 28, 2022

(30) Foreign Application Priority Data

Dec. 3, 2020   (DE) .......................... 102020215276.4

(51) Int. Cl.
| | | |
|---|---|---|
| *F16K 1/36* | (2006.01) | |
| *B60H 1/32* | (2006.01) | |
| *F16K 31/08* | (2006.01) | |
| *F16K 37/00* | (2006.01) | |

(52) U.S. Cl.
CPC .............. *F16K 1/36* (2013.01); *F16K 31/084* (2013.01); *B60H 2001/3286* (2013.01); *F16K 37/0033* (2013.01)

(58) Field of Classification Search
CPC .. F16K 37/0033; F16K 15/064; F16K 17/044; F16K 1/36; F16K 31/084
See application file for complete search history.

(56) References Cited

U.S. PATENT DOCUMENTS

| | | | | |
|---|---|---|---|---|
| 870,659 A | * | 11/1907 | Ackerman | ............ F16K 15/064 137/516.13 |
| 5,456,283 A | * | 10/1995 | Schap | ...................... F16F 9/516 137/514.7 |
| 5,580,226 A | * | 12/1996 | Staib | ...................... B60T 8/4031 137/538 |
| 6,220,571 B1 | * | 4/2001 | Kim | ...................... F16K 31/047 251/903 |
| 6,705,551 B1 | * | 3/2004 | Kienzler | ................ F02M 47/02 239/533.5 |
| 8,651,456 B2 | * | 2/2014 | Zhan | ........................ F25B 41/34 251/83 |
| 9,810,461 B2 | * | 11/2017 | Zhan | ........................ F16K 15/18 |
| 10,018,169 B2 | * | 7/2018 | Koeninger | ........... F02M 61/205 |
| 11,261,974 B2 | * | 3/2022 | Wei | ......................... F25B 41/30 |

(Continued)

FOREIGN PATENT DOCUMENTS

| | | | | |
|---|---|---|---|---|
| AU | 2017100462 A4 | * | 6/2017 | ............ F16K 11/044 |
| CN | 106286936 A | * | 1/2017 | ............... F16K 1/32 |

(Continued)

OTHER PUBLICATIONS

Chinese Search Report, CN202111453557.7, dated Sept. 9, 2023 (w_translation).

(Continued)

*Primary Examiner* — Nelson J Nieves
(74) *Attorney, Agent, or Firm* — Fishman Stewart PLLC

(57) ABSTRACT

A valve body of an expansion valve for an air-conditioning system, a battery cooler, and/or an oil cooler of a motor vehicle may comprise a valve needle and a spring. The valve needle and the spring may be integrally provided as a single component.

20 Claims, 2 Drawing Sheets

(56) References Cited

U.S. PATENT DOCUMENTS

| | | | |
|---|---|---|---|
| 11,262,770 B2* | 3/2022 | Czechowski | G05D 16/10 |
| 2003/0000583 A1* | 1/2003 | Kuhn | F16K 15/026 |
| | | | 137/536 |
| 2013/0032115 A1* | 2/2013 | Zitarosa | F16K 17/0493 |
| | | | 123/188.8 |
| 2013/0206851 A1 | 8/2013 | Sekiguchi | |
| 2016/0146366 A1* | 5/2016 | Takahashi | F16K 3/00 |
| | | | 251/129.15 |
| 2018/0119879 A1* | 5/2018 | Hess | F16N 13/02 |
| 2018/0149395 A1* | 5/2018 | Takada | F16K 1/00 |
| 2018/0291851 A1* | 10/2018 | Filippi | F16F 1/041 |
| 2018/0299029 A1* | 10/2018 | Uehara | H02K 5/128 |
| 2020/0224622 A1* | 7/2020 | Yamamoto | F16K 31/0686 |
| 2021/0116947 A1* | 4/2021 | Czechowski | G05D 16/10 |
| 2022/0178599 A1* | 6/2022 | Van Delden | F25B 41/35 |
| 2022/0214090 A1* | 7/2022 | Moser | H02K 7/14 |
| 2022/0316618 A1* | 10/2022 | Billet | F16K 31/04 |
| 2022/0316777 A1* | 10/2022 | Zhan | F16K 31/04 |

FOREIGN PATENT DOCUMENTS

| | | | | |
|---|---|---|---|---|
| CN | 209042824 U | | 6/2019 | |
| CN | 211117617 U | | 7/2020 | |
| CN | 111998567 A | * | 11/2020 | F25B 49/00 |
| DE | 2600284 B2 | | 6/1978 | |
| DE | 3139170 A1 | * | 4/1983 | |
| EP | 3392538 A1 | | 10/2018 | |
| EP | 3418613 A1 | | 12/2018 | |
| GB | 2258519 A | * | 2/1993 | F16K 15/205 |
| JP | 2004520552 A | * | 7/2004 | |
| WO | WO-2014107998 A1 | * | 7/2014 | F16K 1/00 |

OTHER PUBLICATIONS

Chinese Office Action, CN202111453557.7, dated Sep. 14, 2023 (w_translation).
English abstract for DE-2600284.
German Search Report for DE-102020215276.4, dated Aug. 25, 2021.

* cited by examiner

VALVE BODY FOR AN EXPANSION VALVE

CROSS-REFERENCE TO RELATED APPLICATIONS

This application claims priority to German Patent Application No. DE 102020215276.4, filed on Dec. 3, 2020, the contents of which is hereby incorporated by reference in its entirety.

TECHNICAL FIELD

The present invention relates to a valve body for an expansion valve for an air-conditioning system of a motor vehicle. In addition, the invention relates to a rotor having such a valve body and to an expansion valve having such a valve body and/or such a rotor and to an air-conditioning system of a motor vehicle having such an expansion valve.

BACKGROUND

From EP 3 392 538 A1 an electrically actuatable valve having a rotor and a stator separated from the same by way of a separating can. In order to detect an angle of rotation position of the rotor, a sensor is provided.

Expansion valves, also called throttle valves, are valves which, by locally constricting a flow cross section, diminish the pressure of a fluid flowing through and thereby cause an increase in volume or expansion. In air-conditioning systems, in particular in motor vehicles, such an expansion valve reduces the pressure of a refrigerant, which usually enters the expansion valve as almost boiling liquid. In the process, it is subjected to an isenthalpic change of state, since the refrigerant on passing through the expansion valve expands (pressure drop from for example 10 bar to 1 bar with simultaneous drop of the liquid temperature). The objective of the expansion in the valve is that the liquid enters the evaporator slightly superheated (still liquid). Furthermore, the refrigerant enters the evaporator, in which the evaporation process of the liquid fraction of the refrigerant absorbs heat from the surroundings and thereby evaporates. The fluid or air flowing through the evaporator (heat exchanger) is cooled in the process.

However, disadvantageous in the electric expansion valves known from the prior art is that these have a comparatively complex, elaborate design and thus an expensive structure.

SUMMARY

The present invention therefore deals with the problem of stating an improved or at least an alternative embodiment for a valve body, with which in particular the disadvantages known from the prior art can be overcome.

According to the invention, this problem is solved through the subject matter of the independent claim(s). Advantageous embodiments are the subject matter of the dependent claim(s).

The present invention is based on the general idea of now forming a valve body having a valve needle and a spring, which in valve bodies known to date from the prior art where formed in two parts, integrally for the first time and thereby being able to produce an expansion valve equipped with such a valve body simpler in design and more cost-effective and in particular also with fewer individual parts. The valve body according to the invention no longer needs to be installed with a spring in a rotor of an expansion valve as is the case up to now, since the spring already forms an integral part of the valve body. By way of the integral design of the valve needle and of the spring it is not only that assembly costs can be reduced, but also storage and logistical costs. By way of the integral design, the handling is additionally simplified significantly. A reduction of the tolerance chains can also be achieved since, because of the reduced number of parts, smaller operational and assembly clearances occur.

In an advantageous further development of the valve body according to the invention, the spring comprises two meander-shaped arms which at the one end are integrally connected to the valve needle and on the other hand to a support ring, in particular a support disc. The meandering arms offer a spring force which, depending on the arm thickness or depending on the arm cross section, can be easily adjusted and make possible a tilt-free preloading with respect to a valve body guide, in which the valve needle is translationally adjustably mounted. At the same time, the support ring makes possible an areal supporting on for example a permanent magnet body of a rotor of an expansion valve, as a result of which compared with for example a coil spring a comparatively low contact pressure occurs between the spring and the permanent magnet body of the rotor during the closing operation, i.e. while the valve body with its valve needle is pressed onto the valve seat, so that for example even a twisting of the support ring relative to the permanent magnet body is still possible.

Practically, the two arms of the spring meander opposite to one another. By way of this it is possible to avoid a rotary movement of the valve body during the tensioning of the spring arms, as a result of which the same, even during the tensioning of the arms, is merely adjusted translationally, but not rotationally.

In a further advantageous embodiment of the valve body according to the invention, the valve needle comprises a collar and a conical valve face, wherein a longitudinal groove can be provided which extends from the collar via the valve needle as far as to the valve face. Together with the support ring, which has a central opening for example for a refrigerant, a reliable letting-through of refrigerant with opened expansion valve can thus be achieved. This is important in particular for the reason that during the opening of the expansion valve the collar is moved into the space, in which the springs are arranged and fluid therefore has to escape out of this space in order to prevent an excessive pressure increase. Here, the longitudinal groove serves as drain since the medium can otherwise escape only through the thread and between needle and brass sleeve. However, the cross sections there are very small so that the pressure resistance during the opening would thus be significantly higher.

In an advantageous further development of the solution according to the invention, the valve body including valve needle and spring is formed as an integral plastic injection moulded part or generally of plastic. This offers the great advantage that the valve body can be formed in a high quality and cost-effectively at the same time. A further major advantage materialises with a design of plastic in that the plastic hardens or becomes brittle provided the same is cooled down. At the same time, the spring is shorted when cooled down, as a result of which a preload loss occurs. However, because of the plastic that becomes more brittle or harder during a cooling-down, the spring again gains more force with lower compression. Conversely, the same occurs also during a temperature increase, during which the spring expands and a greater compression thereby occurs while the plastic however becomes softer at the same time, as a result of which the spring force in turn decreases. Because of this, the spring in its axial pressure force levels out about a predefined operating point in a relatively stable manner.

The present invention is based, furthermore, on the general idea of equipping a rotor of an expansion valve with a valve body described in the preceding paragraphs, wherein the rotor comprises a permanent magnet body which, together with the valve body and the valve body guide, forms a pre-assembled assembly. By way of this it is possible to completely prefabricate such a rotor and install an expansion valve in this pre-assembled state. Because of the possibility of prefabricating the rotor, its assembly can be outsourced or transferred to separate workstations. By way of this, a production process can be positively influenced.

The present invention, furthermore, is based on the general idea of equipping an expansion valve for an air-conditioning system, a battery cooler and/or an oil cooler with such a valve body or a rotor described in the preceding paragraph. Here, the expansion valve according to the invention has a housing and a stepping motor, which comprises a stator and a rotor arranged therein. Here, the rotor can be formed out of the pre-assembled assembly comprising the permanent magnet body, the valve body and the valve body guide. Because of this, it is possible to produce such an expansion valve altogether from fewer components and thus more cost-effectively with respect to an assembly as well as storage and logistical costs.

Practically, a sensor for detecting a position of the valve body is provided. Such a sensor is situated for example in a dry region in the housing of the expansion valve, which is separated from a rotor-side wet region by a separating can, which surrounds the rotor. By arranging the sensor in the dry region the same can be arranged in a protected manner. By way of the sensor, which is formed for example as 3D hall sensor, a magnetic field generated by the permanent magnet body of the rotor, and by way of this the position of the rotor and thus of the valve body and thus the opening state of the expansion valve can be detected. Such a 3D hall sensor is cost-effective and thus makes possible a cost-effective yet extremely exact detection of an opening or closing position of the expansion valve.

Further, the present invention is based on the general idea of equipping an air-conditioning system with such an expansion valve and thereby transfer the advantages of the expansion valve described before to the air-conditioning system.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
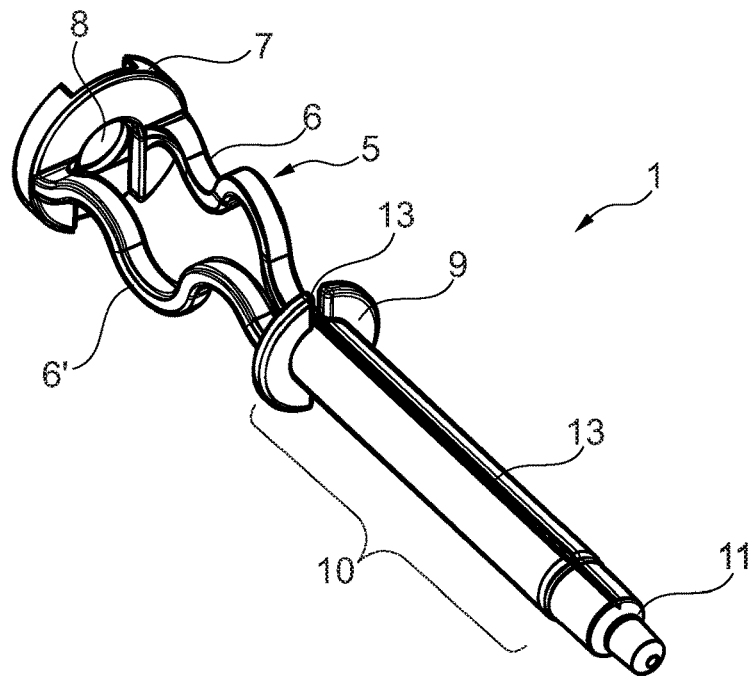
FIG. 1 shows a valve body according to the invention in a view.

According to FIG. 1, a valve body 1 of an expansion valve 2 (see FIG. 3) according to the invention, for an air-condition system 3, a battery cooler and/or an oil cooler of a motor vehicle 4, comprises a valve needle 10 and a spring 5, wherein the valve needle 10 and the spring 5 according to the invention are formed integrally. Through the integral design a number of parts in particular can be reduced as a result of which storage and logistical costs as well as assembly costs can be reduced.

By way of the integral design of the valve body 1, a tolerance chain can also be reduced since the spring 5 and the valve needle 10 need no longer be assembled together but are already produced in a firmly bonded state and because of this the operating or assembly clearance usually materialising when assembling the spring on the valve body is no longer required.

Figure 2:
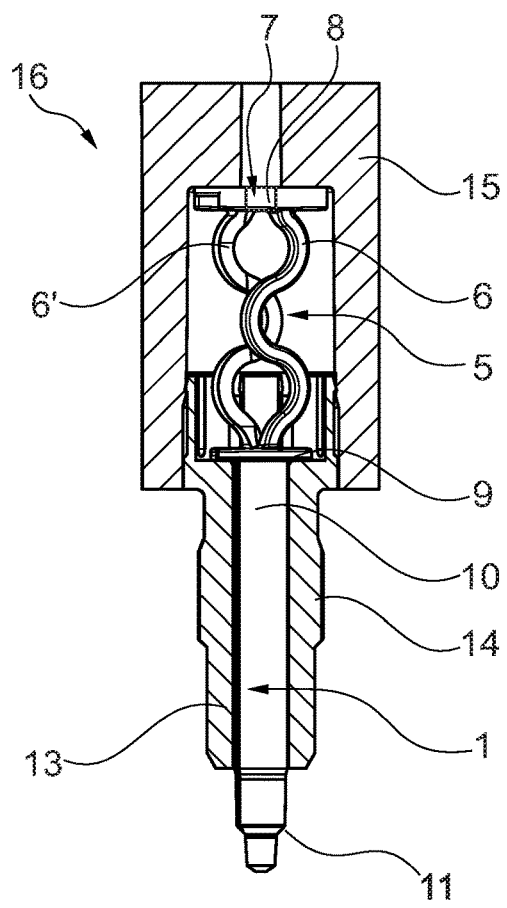
FIG. 2 shows a rotor according to the invention having a valve body according to the invention in a sectional representation.
Figure 3:
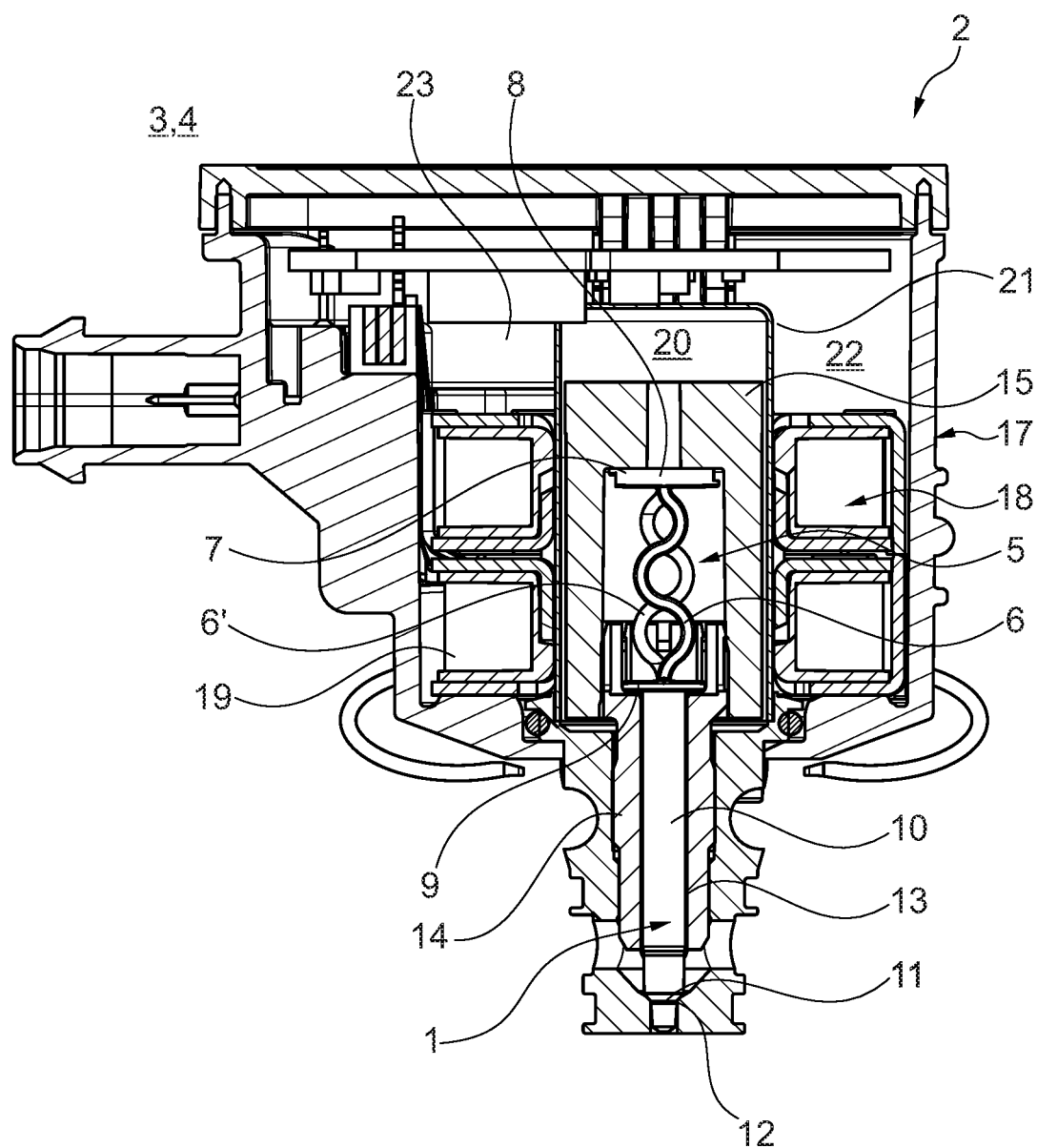
FIG. 3 shows a sectional representation through an expansion valve according to the invention for example for an air-conditioning system.

Here, the spring 5 according to FIGS. 1 to 3 comprises two meander-shaped arms 6, 6', which at one end are integrally connected to the valve body 1 and at the other end to a support ring 7. The support ring 7 has an opening 8 via which fluid, for example refrigerant, can be conducted.

According to FIGS. 1 to 3, the two arms 6, 6' are formed meandering opposite to one another (see in particular FIGS. 2 and 3), as a result of which a twisting of the valve body when the spring 5 is loaded can be avoided. According to FIGS. 1 to 3, the two arms 6, 6' have altogether three meander-shaped arcs, wherein obviously more or fewer such arcs are also conceivable.

Viewing the valve needle 10 in more detail it is noticeable that the same comprises a collar 9 and a conical valve face 11. With closed expansion valve 2, the valve needle 10 or the valve body 1 tightly lies on an associated valve seat 12 (see FIG. 3) by way of the conical valve face 11.

Likewise, a longitudinal groove 13 is provided, which extends from the collar 9 via the valve needle 10 as far as to the valve face 11. By way of the longitudinal groove 13, a fluid conduction within a valve body guide 14 (see FIGS. 2 and 3) can take place. In the valve body guide 14, the valve body 1 is guided without tilt and preferentially without play. Through the opposing meandering course of the arms 6, 6', a tilt-free adjusting can also be ensured. Here, the spring 5 and the arms 6, 6' can be formed out of plastic, which offers the great advantage that the spring 5, upon a reduction of the temperature, is reduced, but at the same time also stiffens since the plastic becomes harder and more brittle and the spring 5, upon lower compression due to the length, presses with greater force. Conversely, the same also occurs upon a temperature increase, as a result of which the spring 5 is extended and because of this axially develops a greater pressure force but becomes softer at the same time and the pressure force is thereby reduced again. By way of this, the spring 5, in its axial pressure force, fluctuates to and fro about a defined operating point in a relatively stable manner.

In addition, the arms 6, 6' of the spring 5 make possible a twisting of the spring 5 in the stop, since through the comparatively large support ring 7 within a permanent magnet 15 only a very low contact pressure develops during the closing operation. Because of the present medium or the fluid present within the expansion valve 2, for example refrigerant and gear oil, a lubricated state is additionally present at all times. Because of this, the support ring 7 is able to follow by slipping in the event that the spring 5 is tensioned excessively. By way of this, a torsion failure can be reliably excluded. Beyond this, the arms 6, 6' are extremely flexible because of their arc design and adapt through a slightly inclined position to a torsion between valve body 1 and support ring 7.

Here, the collar 9 represents a stop with which the valve body 1 lies against the valve body guide 14, as is shown according to FIGS. 1 and 2. In a particularly preferred embodiment, the valve needle 10 including the spring 5 with the support ring 7 and the arms 6, 6' is formed as an integral plastic injection moulded parts, as a result of which not only a high-quality but additionally also a cost-effective production becomes possible.

According to FIG. 2, a rotor 16 according to the invention is shown, which comprises a valve body 1 with spring 5, a permanent magnet body 15 and a valve body guide 14, which form a pre-assembled assembly with one another. An assembly of the rotor 1 can take place as follows: initially, the valve body 1 with its valve needle 10 is inserted into the valve guide 14 and following this the valve body guide 14 screwed into an internal thread of the permanent magnet body 15. Through the screwing-in, the support ring 7 of the spring 5 abuts the inner front face of the permanent magnet body 15, as a result of which the spring 5 is compressed. Following this, the rotor 16 prefabricated in this manner can be installed in the expansion valve 2 according to FIG. 3.

In addition, the expansion valve 2 has a housing 17 and a stepping motor 8, which is formed out of the rotor 16 and a stator 19 surrounding the rotor 16. In the housing 17, the previously described valve seat is arranged in addition, against which the valve needle 10 of the valve body 1 of the rotor 16 is preloaded with its valve face 11 via the spring 5. Here, the rotor 16 is situated in a wet region 20, which is separated from a dry region 22 by a separating can 21. In addition, a sensor 23, for example a 3D hall sensor sits in the dry region, via which a magnetic field generated by the permanent magnet body 15 is detected and from this the position of the valve body one or indirectly an opening or closing state of the expansion valve 2 can be deduced.

With the integral valve body 1 according to the invention, the pre-assembled rotor 16 and the expansion valve 2 comprising the said rotor 16 or the valve body 1 with integrated spring 5, such an expansion valve 2 can be more easily and more cost-effectively constructed and more easily assembled at the same time. By integrating the spring 5 on or in the valve body 1, the number of parts can be additionally reduced, as a result of which storage and logistical costs can be lowered.

The invention claimed is:

1. A valve body of an expansion valve for an air-conditioning system, a battery cooler, and/or an oil cooler of a motor vehicle, the valve body comprising a valve needle and a spring, wherein:
the valve needle and the spring are integrally provided as a single component;
the spring includes at least one meander-shaped arm integrally connected to the valve needle;
the at least one meander-shaped arm includes a plurality of arcs disposed one after another; and
adjacent arcs of the plurality of arcs are oriented in opposite directions.

2. The valve body according to claim 1, wherein:
the at least one meander-shaped arm includes two meander-shaped arms; and
the two arms are each integrally connected to the valve needle at one end and to a support ring at the other end.

3. The valve body according to claim 2, wherein the two arms extend, meandering, opposite to one another.

4. The valve body according to claim 1, wherein the valve needle includes a collar and a conical valve face.

5. The valve body according to claim 4, wherein the valve needle and the spring are configured as an integral, plastic injection moulded part.

6. The valve body according to claim 4, further comprising a longitudinal groove extending from the collar via the valve needle to the valve face.

7. The valve body according to claim 1, further comprising a support ring including an opening via which fluid is conductible, wherein the at least one meander-shaped arm includes two meander-shaped arms that are each integrally connected to the valve needle at one end and integrally connected to the support ring at the other end.

8. The valve body according to claim 1, wherein:
the at least one meander-shaped arm includes two meander-shaped arms;
the plurality of arcs includes (i) a plurality of first arcs that open in a first direction and (ii) a plurality of second arcs that open in a second direction opposite the first direction;
the plurality of first arcs and the plurality of second arcs are disposed one after another in an alternating manner such that the two arms are each meander-shaped; and
a first arm of the two arms and a second arm of the two arms meander opposite one another such that (i) the plurality of first arcs of the first arm and the plurality of second arcs of the second arm are aligned and (ii) the plurality of second arcs of the first arm and the plurality of first arcs of the second arm are aligned.

9. The valve body according to claim 1, further comprising:
a collar configured to engage a valve guide body, the collar disposed axially between the valve needle and the spring, the collar projecting radially beyond the valve needle; and
a support ring configured to engage a permanent magnet;
wherein the at least one meander-shaped arm includes two meander-shaped arms; and
wherein the two arms are integrally connected to the collar at a first end and are integrally connected to the support ring at a second end.

10. A rotor of an expansion valve, comprising:
a valve body including a valve needle and a spring, the valve needle and the spring integrally provided as a single component;
a valve body guide; and
a permanent magnet body;
wherein the permanent magnet body, together with the valve body and the valve body guide, define a pre-assembled assembly;
wherein the valve needle includes a collar and a conical valve face; and
wherein the valve body includes a longitudinal groove extending from the collar, via the valve needle, to the valve face.

11. The rotor according to claim 10, wherein:
the spring includes at least one meander-shaped arm-includes including a plurality of arcs disposed one after another; and
adjacent arcs of the plurality of arcs are oriented in opposite directions.

12. The rotor according to claim 10, wherein the valve body, with the valve needle, is guided free of play in the valve body guide.

13. The rotor according to claim 10, wherein:
the valve body further includes a support ring;
the spring includes two arms;
the two arms are each integrally connected to the valve needle at one end and integrally connected to the support ring at the other end; and
the two arms each include a plurality of arcs disposed one after another such that the two arms are each meander-shaped.

14. An expansion valve for an air-conditioning system, a battery cooler, and/or an oil cooler of a motor vehicle, the expansion valve comprising:
a housing;
a valve seat; and
a valve body interacting with the valve seat;
wherein the valve body includes a valve needle and a spring, the valve needle and the spring integrally provided as a single component;
wherein the spring includes at least one arm integrally connected to the valve needle; and
wherein the at least one arm includes a plurality of arcs disposed one after another such that the at least one arm is meander-shaped.

15. The expansion valve according to claim 14, further comprising a sensor structured and arranged to detect a position of the valve body.

16. An air-conditioning system of a motor vehicle, comprising the expansion valve according to claim 14.

17. The expansion valve according to claim 14, wherein the valve needle includes a conical valve face abutting the valve seat.

18. The expansion valve according to claim 14, wherein:
the at least one arm includes two arms; and
the valve body includes a support ring integrally connected to the two arms opposite the valve needle.

19. The expansion valve according to claim 18, wherein the valve needle includes a collar integrally connected to the two arms opposite the support ring.

20. The expansion valve according to claim 19, wherein:
the support ring includes an opening via which a fluid is conductible;
the valve needle includes a conical valve face abutting the valve seat; and
the valve needle further includes a longitudinal groove configured to conduct the fluid, the longitudinal groove extending from the collar to the valve face.

\* \* \* \* \*